United States Patent [19]

Behshid

[11] Patent Number: 5,052,846

[45] Date of Patent: Oct. 1, 1991

[54] APPARATUS FOR JOINING FENCING ENCLOSURES

[76] Inventor: Masood Behshid, 4339 Chevy Chase Dr., La Canada, Calif. 91011

[21] Appl. No.: 581,810

[22] Filed: Sep. 13, 1990

[51] Int. Cl.$^5$ .............................................. F16B 7/08
[52] U.S. Cl. .................................. 403/188; 403/384; 403/353; 403/405.1
[58] Field of Search ................. 403/353, 405.1, 407.1, 403/DIG. 10, 384, 188

[56] References Cited

U.S. PATENT DOCUMENTS

| 3,332,182 | 7/1967 | Mark | 403/353 X |
| 3,849,012 | 11/1974 | Krouse | 403/353 X |

FOREIGN PATENT DOCUMENTS

| 265089 | 2/1927 | United Kingdom | 403/403 |
| 338180 | 11/1930 | United Kingdom | 403/403 |

Primary Examiner—Andrew V. Kundrat

[57] ABSTRACT

A fastener for joining together panels of enclosures having keyhole-shaped holes adjacent one another in abutting side frames, the fastener including a back plate having a size adapted to cover adjacent holes in abutting side frames, a pair of arms projecting at essentially right angles from the back plate, each of the pair of arms adapted to fit within the smaller portion of the keyhole-shaped holes in the abutting side frames, and an enlarged end portion on each of the arms adapted to fit through the larger portion of the keyhole-shaped holes but not to fit through the smaller portion of the keyhole-shaped holes.

5 Claims, 3 Drawing Sheets

APPARATUS FOR JOINING FENCING ENCLOSURES

FIELD OF THE INVENTION

This invention relates to fasteners and, more particularly, to apparatus for rapidly joining fencing panels together to provide a secure enclosure.

HISTORY OF THE PRIOR ART

Fencing is often used to provide areas in which items may be stored. Fencing enclosures are typically constructed of individual panels of mesh wire or other fencing material which covers peripheral frames made of angle iron or the like. The present method of connecting together fencing panels to provide an area which may be used to protect items against theft or other loss requires that each panel be joined to the next by nuts and bolts. The adjoining panels are connected by bolting the edges of the frames together. The process is very time consuming and labor intensive and is, consequently, very expensive. Because conventional nuts and bolts are used, the fenced areas may be easily entered if unguarded by simply removing the nuts and bolts.

SUMMARY OF THE INVENTION

It is, therefore, an object of the present invention to substantially reduce the cost of constructing fencing enclosures surrounding storage areas.

It is another object of the present invention to provide a device which reduces the installation time of fencing enclosures and thereby hastens their completion.

It is another more specific object of the present invention to provide a new inexpensive arrangement for securing individual panels of fencing enclosures together.

It is another object of the present invention to provide a more secure arrangement for connecting individual panels of fencing together.

These and other objects of the present invention are realized in a fastener for joining together panels of enclosures having abutting side frames with keyhole-shaped receptacles adjacent one another in the abutting side frames, the fastener comprising a back plate having a size adapted to cover adjacent keyhole-shaped receptacles in abutting side frames, a pair of arms projecting at essentially right angles from the back plate, each of the pair of arms adapted to fit within the smaller portion of the keyhole-shaped receptacles in the abutting side frames, and an enlarged end portion on each of the arms adapted to fit through the larger portion of the keyhole-shaped receptacles but not to fit through the smaller portion of the keyhole-shaped receptacles.

These and other objects and features of the invention will be better understood by reference to the detailed description which follows taken together with the drawings in which like elements are referred to by like designations throughout the several views.

DETAILED DESCRIPTION OF THE INVENTION

Figure 1:
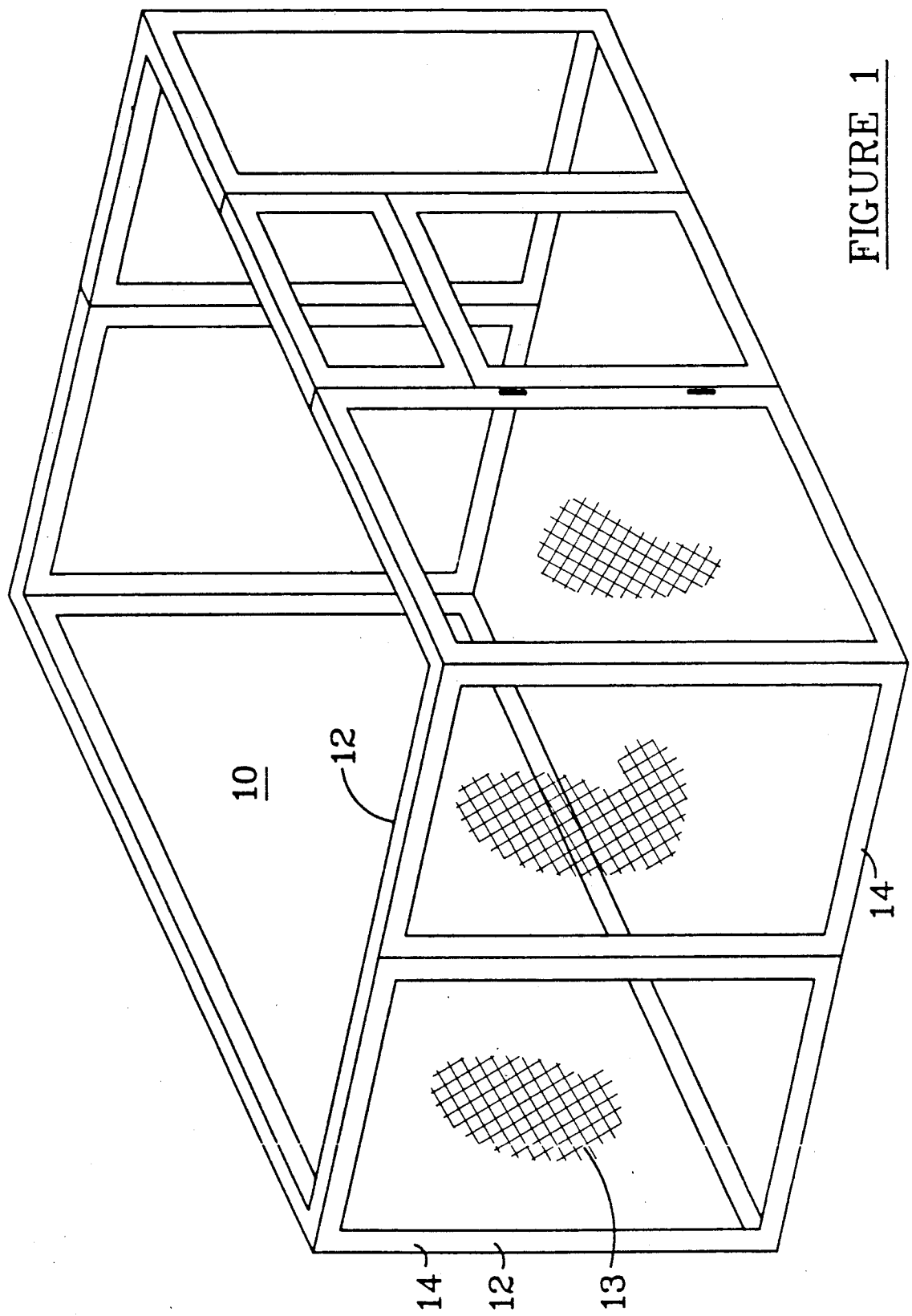
FIG. 1 is a isometric view illustrating an arrangement in accordance with the prior art for joining together fencing panels.

Referring now to FIG. 1, there is shown a perspective view of a fenced enclosure 10 conventionally used for storing items. Such a fenced enclosure 10 is often used by companies to store item within various company areas so that the items need not be continually locked in more expensive storage areas. The enclosure 10 is typically constructed of individual panels or wire mesh fencing 12. The wire mesh fencing 13 covers and is secured to an exterior peripheral frame 14 to form each fencing panel 12. The exterior peripheral frame 14 of each fencing panel 12 may be constructed of angle iron or similar preformed metal having individual sides welded or otherwise joined together to form the rectangle of the frame 14. The individual frames 14 of adjacent fencing panels 12 are typically joined together by nuts and bolts.

Figure 2:
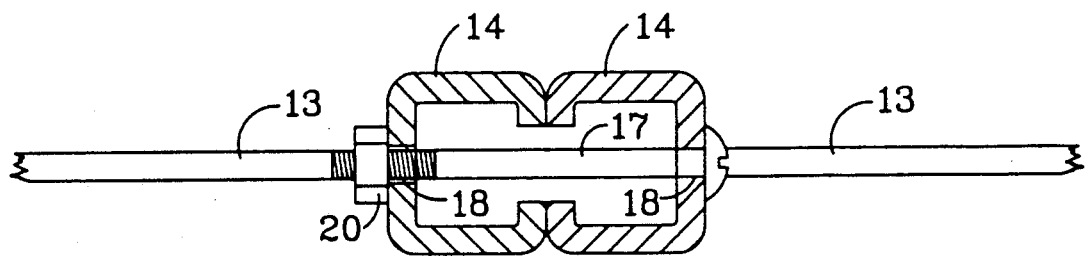
FIG. 2 is a top view illustrating in detail the arrangement of the prior art for connecting together fencing panels for enclosing an area.

FIG. 2 is an enlarged cross-sectional view of a detail of the enclosure 10 illustrating the typical arrangement for connecting together two adjacent fencing panels 12 in accordance with the prior art. FIG. 2 shows two adjacent frame members 14 abutted against one another and joined together in the manner of the prior art. As may be seen, the surrounding angle iron frame 14 of the panel 12 to the left abuts the frame 14 of the panel 12 to the right. Bolts 17 are placed in holes 18 through the frames 14. Nuts 20 which each may bear on a lock washer (not shown in the figure) secure the bolts 17 and firmly fasten the two frames 14 and thus the panels 12 together.

The bolts and nuts used to secure the fencing frames 14 together accomplish that. However, the amount of time required to place all of the nuts and bolts necessary to provide a complete enclosure is very significant. In fact, the cost of the labor involved in placing and securing the nuts and bolts to hold the fencing panels together averages approximately thirty percent of the total cost of the installation of a fencing compound. Moreover, the necessity of arranging the nuts and bolts in order to allow the most facile and least expensive process of joining the panels makes the arrangement less than secure. Since the heads of the nuts and bolts must project from the frames in order to facilitate joining the panels together, it is quite easy to simply remove the nuts from the bolts, remove a panel, and enter the fenced area. Significant amounts of goods may be removed and the fence replaced without indicating that the compound has been entered without permission.

Figure 4:
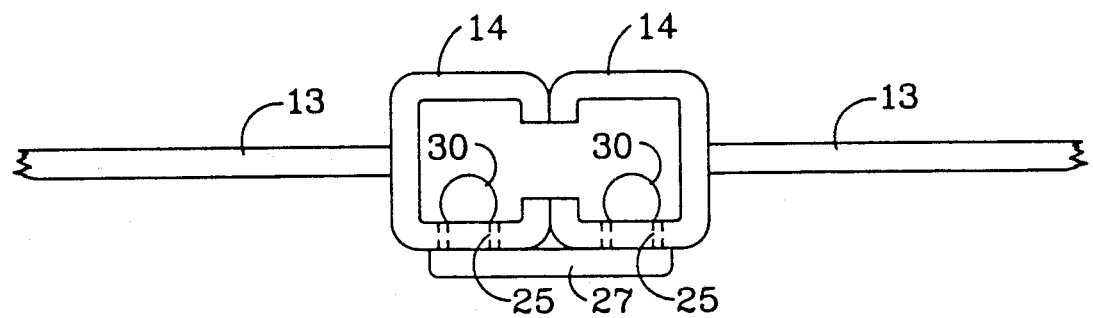
FIG. 4 is a top view illustrating an arrangement in accordance with the present invention for joining together fencing panels.
Figure 5:
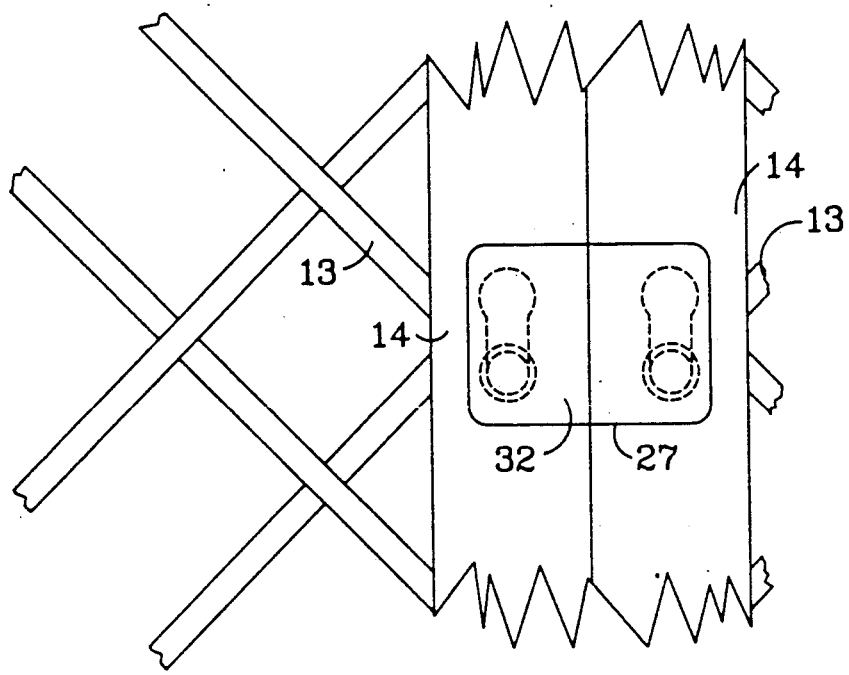
FIG. 5 is a front view illustrating an arrangement in accordance with the present invention for joining together fencing panels.
Figure 3:
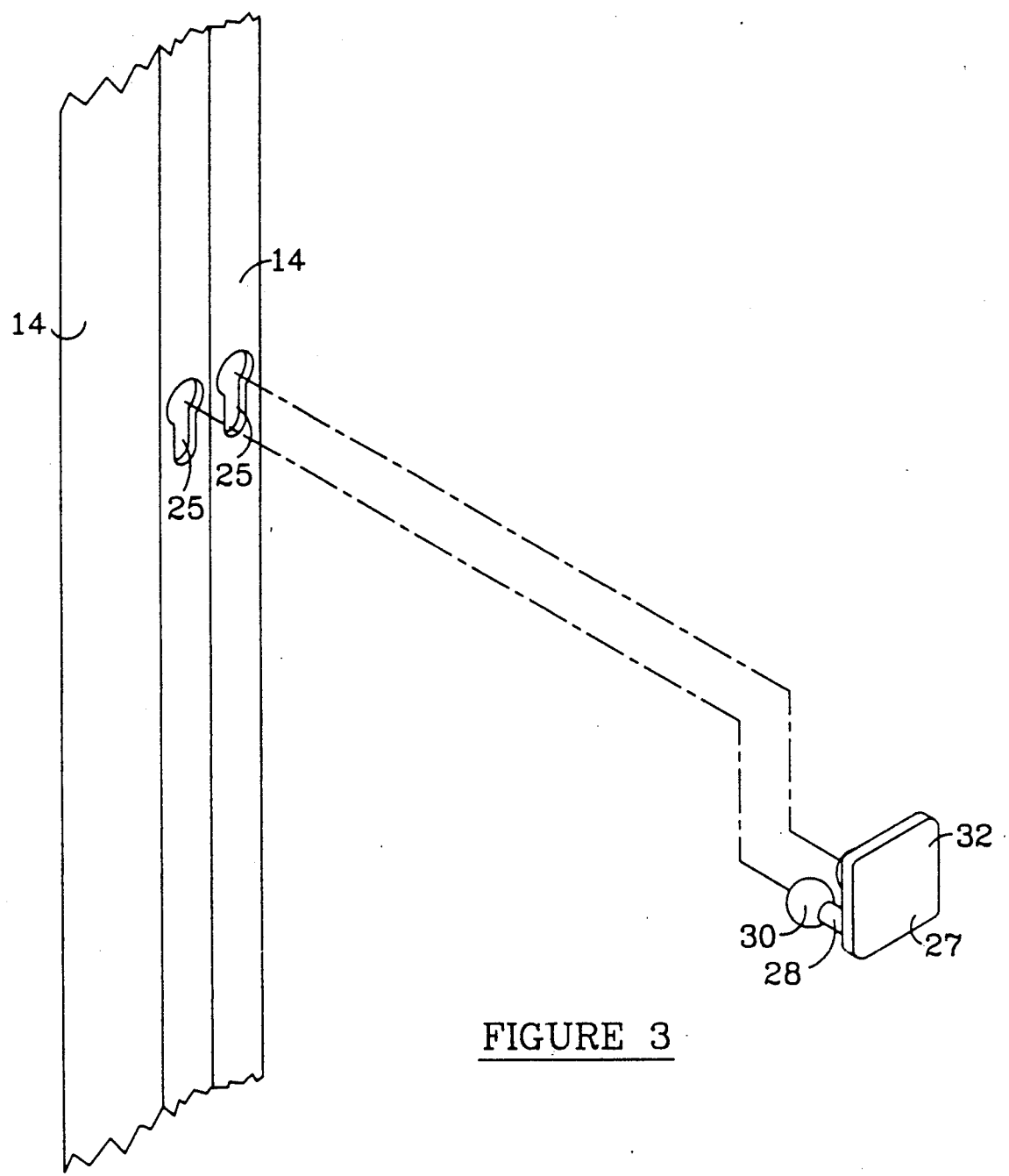
FIG. 3 is an enlarged exploded perspective view illustrating an arrangement in accordance with the present invention for joining together fencing panels.

FIG. 3 is an enlarged exploded perspective view illustrating an arrangement in accordance with the present invention for joining together fencing panels. FIG. 4 is a top view illustrating the arrangement of FIG. 3. FIG. 5 is a front view illustrating the arrangement of FIG. 3. These Figures should be considered together in the following description of the invention. In the arrangement shown in FIGS. 3-5, a pair of adjacent fencing panels 12 are illustrated. The adjoining vertical edges of the frames 14 of those panels 12 each have a key-shaped hole 25 cut or otherwise formed in a position which lies immediately adjacent a similar hole 25 in the abutted frame 14. A fastener or insert 27 has a pair of projecting arms or shanks 28. The fastener 27 may be constructed of a ferrous metal or other material adapted to suit the security of the particular situation. Each of the arms 28 terminates in a generally ball-shaped end portion 30. Each ball-shaped end portion 30 is of a diameter to fit within the upper end of the key-shaped holes 25 but is too large to fit the lower portion of the key-shaped holes 25. The diameter of the shank 28 is just less than the lower portion of holes 25. The distance between the center of the two shanks 28 is the same as the distance between the central vertical axes of the two adjoining holes 25.

Thus, the end portions 30 of a fastener 27 may be placed within the upper portions of two adjacent holes 25. A back 32 of the fastener 27 which mounts the shanks 28 may be forced downwardly causing the shanks 28 to slide down into the lower portions of the holes 25. In this position, the shanks 28 joined by the back 32 hold the two panels 12 securely together. Moreover, the ball ends 30 keep the back 32 from pulling out of the holes 25. In this manner, two panels 12 may be joined together at one position. By providing holes 25 at a number of convenient positions at the adjoining portions of the frames 14, one panel 12 may be securely joined to another panel 12.

The time required to join panels 12 to one another is drastically reduced using the present invention. Rather than having to take the time to bolt panels together (a time which may average over a minute per bolt), only a very few seconds is necessary to place the fastener 27 into the holes 25 and drive it into place. This substantially reduces the labor cost of constructing fenced areas.

Moreover, fenced enclosures constructed using the present invention are more secure than are enclosures constructed by simply bolting the panels together. First, the back 32 of each fastener 27 covers the holes through which the joinder of the panels is accomplished and essentially withholds the details of the joinder from view. Second, the fasteners 27 may be placed on the inside of the enclosure so that they are not reachable to one attempting to get into the area from outside. Third, the dimensions of the fasteners 27 and the holes 25 may be adjusted so that the shanks 28 fit tightly into the lower portions of the keyhole-shaped holes 25 and must be forced therein by a sharp blow to the back 32 by a hammer or the like. Such tolerances then require the same sort of upward blow to the back to remove fasteners 27, a blow which is almost impossible from the exterior of the enclosure.

It will be understood by those skilled in the art that it is not necessary that the shanks 28 be cylindrical or that the ends 30 be ball shaped. These elements might, for example, be rectangular in cross section. What is necessary is that the ends 30 be larger than the shanks 28, that the ends 30 fit through the upper portion of the holes 25 but not the bottoms, and that the shanks just fit (whether tightly or not) through the lower portions of the holes 25. Nor is it necessary that the upper and lower portions of the holes 25 be so oriented so long as their axes lie parallel to one another so that the two shanks 28 may slide into locking arrangement. For example, the back 32 of the fastener 27 might be bent at right angles so that the shanks 28 project at right angles to one another allowing corner posts of the frames 14 to be connected together. Other shapes will occur to those skilled in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A fastening arrangement for joining together panels to provide secure enclosures, the arrangement including a frame from each panel to be joined, each frame having a closed exterior wall and an interior wall having a keyhole-shaped hole, the keyhole-shaped holes in abutting frames being adjacent one another; a back plate having a size adapted to cover adjacent keyhole-shaped holes in abutting side frames, a pair of arms projecting at essentially right angles from the back plate, each of the pair of arms adapted to fit within the smaller portion of the keyhole-shaped holes in the abutting frames, and an enlarged end portion on each of the arms adapted to fit through the larger portion of the keyhole-shaped holes but not to fit through the smaller portion of the keyhole-shaped holes.

2. A fastener as claimed in claim 1 in which each of the pair of arms has an essentially circular cross section.

3. A fastener as claimed in claim 1 in which the enlarged end portion on each of the arms has an essentially circular cross section.

4. A fastener as claimed in claim 2 in which the enlarged end portion on each of the arms has an essentially circular cross section.

5. A fastener as claimed in claim 1 in which each of the pair of arms adapted to fit within the smaller portion of the keyhole-shaped holes in the abutting side frames is of adapted to produce a wedge fit within the smaller portion of the keyhole-shaped hole.

* * * * *